United States Patent [19]

Magnenet

[11] 4,449,132

[45] May 15, 1984

[54] PROCESS AND MACHINE FOR MAGNETOGRAPHIC PRINTING (II)

[75] Inventor: Jean Magnenet, Belfort, France

[73] Assignee: Compagnie Internationale pour l'Informatique Cii-Honeywell Bull, Paris, France

[21] Appl. No.: 380,404

[22] Filed: May 20, 1982

[30] Foreign Application Priority Data

Dec. 23, 1981 [FR] France ............................... 81 24055

[51] Int. Cl.³ ............................................ G01D 15/12

[52] U.S. Cl. .................................... 346/74.7; 430/39; 430/42

[58] Field of Search ...................... 346/1.1, 74.4, 74.7; 358/301; 430/39, 42, 45, 47

[56] References Cited

U.S. PATENT DOCUMENTS

| | | | |
|---|---|---|---|
| 3,823,406 | 7/1974 | Jeffers | 346/74.7 |
| 3,824,601 | 7/1974 | Garland et al. | 346/74.4 |
| 3,965,478 | 6/1976 | Schloemann | 346/74.7 |
| 4,126,494 | 11/1978 | Imamura et al. | 148/31.57 |

FOREIGN PATENT DOCUMENTS 1436164 7/1966 France .

*Primary Examiner*—Thomas H. Tarcza

*Attorney, Agent, or Firm*—Kerkam, Stowell, Kondracki & Clarke

[57] ABSTRACT

The invention relates to a magnetographic printing process, as well as to a machine which enables images in color to be produced on a print carrier. The machine which carries out this process comprises magnetic heads (13-1, . . . , 13-n) excited by pulses emitted by a generator (26) by means of a current calibrating means (27) to produce on the drum (10) magnetized points having different magnetizations, pigment applicator means (40, 42, 44), retouching means (41, 43), and a transfer station (45) where the pigments deposited onto the drum (10) are transferred to a paper strip (21).

The electric current calibrating means is connected between the pulse generator and each of the heads so as to allow each of the current pulses emitted by the generator to be adjusted selectively to one of the p predetermined amplitude values and thus to produce on the recording surface a latent magnetic image whose magnetized points exhibit the same magnetic polarity but have different intensities of magnetization valued as $J_1$, $J_2$, $J_3 \ldots J_p$, such that $J_1 > J_2 > J_3 \ldots > J_p$, each of the values being associated with each one of the p values. The magnetized points are designed to produce image parts which, on the print carrier, must appear in the same color, all having the same intensity of magnetization.

9 Claims, 12 Drawing Figures

10
11
12
S
N
18
19
20
21
22
23

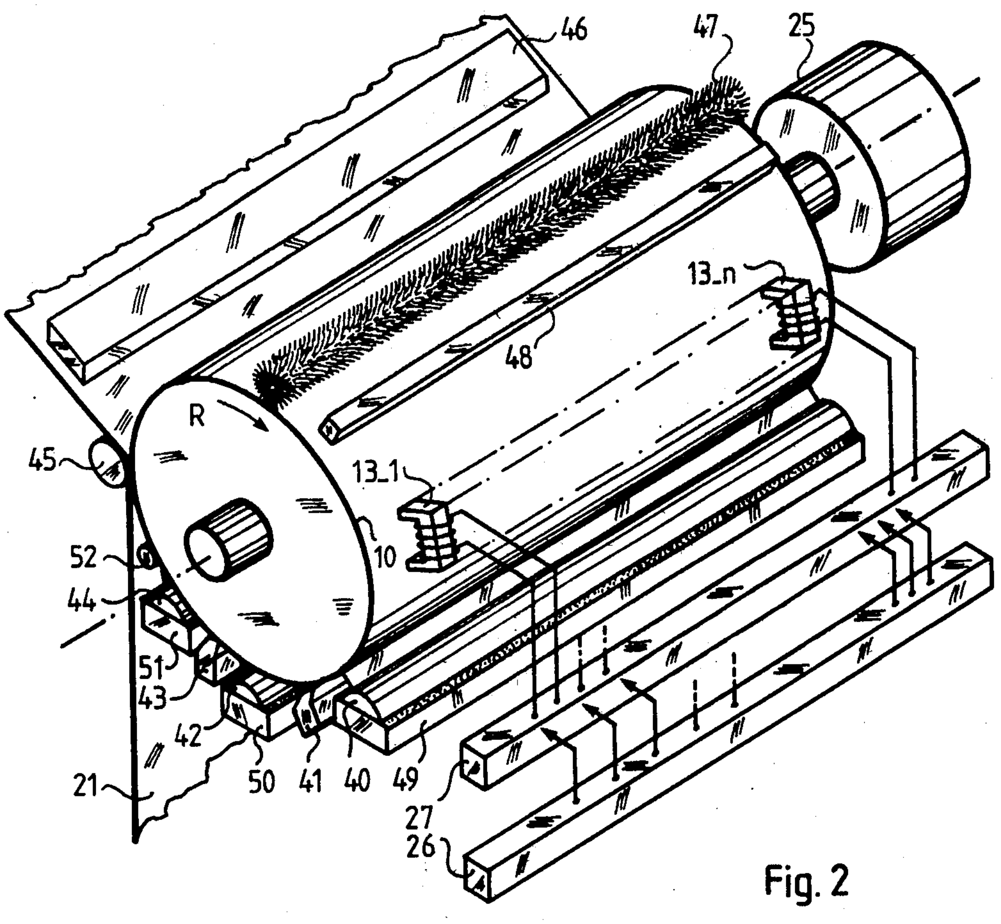
Fig. 2
Fig. 3
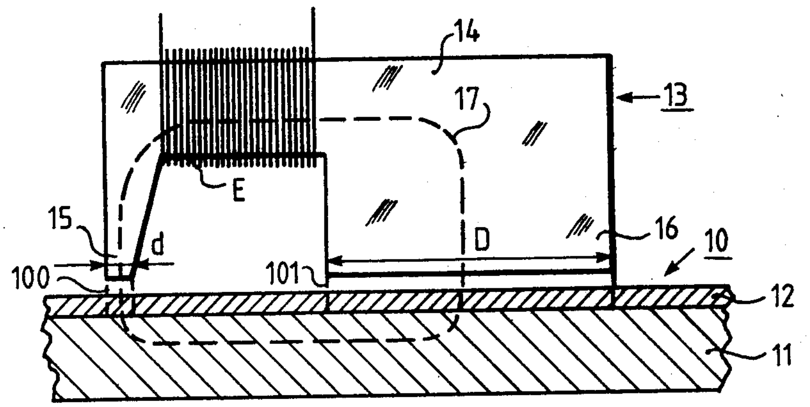

PROCESS AND MACHINE FOR MAGNETOGRAPHIC PRINTING (II)

CROSS REFERENCE TO RELATED APPLICATIONS

The magnetographic printing process described herein is one of four related approaches developed by applicant which enable the production of color images on a print carrier. The other approaches are described and claimed in the following concurrently filed U.S. applications for patent:

Approach I—Ser. No. 380,356; filed May 20, 1982; Process and Machine for Magnetographic Printing (I); J. G. Magnenet; corresponding to Fr. No. 81.24056, filed Dec. 23, 1981.

Approach III—Ser. No. 380,358; filed May 20, 1982; Process and Machine for Magnetographic Printing (II); J. G. Magnenet; corresponding to Fr. No. 81.24059, filed Dec. 23, 1981.

Approach IV—Ser. No. 380,406; filed May 20, 1982; Process and Machine for Magnetographic Printing (IV) J. J. Eltgen; corresponding to Fr. No. 81.24060, filed Dec. 23, 1981.

BACKGROUND OF THE INVENTION

1. Field of the Invention

The present invention relates to a magnetographic printing process which enables the production of images in color on a print carrier, and a machine for carrying out the process.

2. Description of the Prior Art

Magnetographic printing machines which, in response to signals received, which originate from a control unit, enable images, e.g., character images, to be produced on a print carrier generally consisting of a paper strip or sheet are known to those skilled in the art. In such printing machines, which may be of a type similar to that described in French Patent Application No. 2,305,764, corresponding to U.S. Pat. No. 3,945,343 the images are printed, first, by producing from the signals received a latent magnetic image on the surface of a magnetic recording element. The recording element generally is in the shape of a rotating drum or endless belt. The image consists of a group of magnetized zones of very small dimensions. This latent image is then developed by depositing on this surface a powdery developer containing magnetic particles, which remain applied only to the magnetized zones of the recording element so as to produce a powdery image on the surface of that element. Thereupon, the powdery image is transferred to the print carrier.

For certain special applications it may be desirable for the image thus produced to appear on the print carrier in several different colors. In a previously known process, more particularly as described in French Pat. No. 1,053,634, corresponding to U.S. application Ser. No. 154,076, of M. Ralph Blaisell Atkinson, filed Aug. 14, 1951, a color image is printed on the print carrier by, first, producing on the recording element a latent magnetic image corresponding to the portions of the same color of the image to be printed, developing this latent image by means of a developer of the same color, transferring onto the print carrier the powdery image thus obtained, and repeating this operation as many times as there are colors in the image to be printed. Such a process, however, is obviously inconvenient because it takes a very long time to carry it out. Furthermore, despite all the care taken in centering the various powdery images during their transfer onto the print carrier, it is virtually impossible to prevent shiftings, however slight, from occurring between the different parts of the image thus printed which, of course, deleteriously affects the definition of the image eventually produced on the print carrier.

To overcome the above drawbacks, a magnetographic printing process has been proposed, which is described in U.S. Pat. No. 3,965,478. It consists of producing on the surface of the recording element a large number of magnetized elementary zones, all of which produce a latent magnetic image. Each of these elementary zones is obtained by energizing a recording magnetic head by means of an electric current having a frequency which is selected as a function of the color to be produced by this elementary zone when it is developed. The dimensions and the magnetic attraction of this elementary zone are, moreover, determined by the value of the frequency employed. In this process, the development of the latent image formed on the recording element is accomplished by means of a single developer containing particles of different colors and sizes. All particles of the same size are, however, of the same color. During the development of the latent image, the particles of a given size (and, hence, of a given color) are attracted preferentially by the elementary zones, whose dimensions correspond to a given attractive force so that each elementary zone, after the development, is coated with particles whose color corresponds to the frequency that has been used to produce that elementary zone.

In order to carry out such a process, it is, however, necessary to use a developer whose particles of different colors and different sizes must be carefully calibrated, with all the particles of the same color being exactly of the same size. In addition, these particles must be so conditioned that they do not agglomerate, lest they cause errors in color shades during the development of the magnetic latent image. Under these conditions, the fabrication of such a developer is particularly time-consuming, delicate, and relatively expensive. Furthermore, since, the elementary zones formed on the recording element are not all of the same size, depending on the color assigned to them, the images or parts thereof with a shade corresponding to elementary zones of large dimensions produce a definition, i.e., a distinctness of outline and detail, not as good as those whose shade corresponds to elementary zones of small dimensions. Finally, while during the development the elementary zones of small dimensions are capable of attracting only the smallest particles of the developer, it is impossible to prevent the elementary zones of large dimensions from attracting not only the large particles of the developer, but also smaller particles, which, of course, causes the colors to change.

SUMMARY OF THE INVENTION

The present invention overcomes these disadvantages and proposes a magnetographic printing process, as well as a machine for carrying out this process and allows one to obtain on a print carrier and in a relatively short time high-quality color images, while requiring only developers that exhibit the same granulometric state and the same magnetic characteristics.

The invention relates to a magnetograhic printing process which consists in magnetizing the surface of a magnetic recording element in a direction perpendicular thereto so as to produce a group of magnetized points which form a latent magnetic image, then depositing onto said surface a powdery developer designed to be applied only to the magnetized points of said surface and thus form a powder image and, finally, transferring said powder image to a print carrier, said process being characterized in that in order to make it possible to obtain on said carrier an image in p previously selected colors, p being a whole integer equal to at least 2. More particularly the process consists in the steps of:

First, magnetizing the surface of the recording element to produce magnetized points with the same magnetic polarity but with different intensities of magnetization having the values $J_1$, $J_2$, $J_3$, . . . $J_p$ such that $J_1>J_2>J_3 \ldots >J_p$, each of said values being associated with each of the previously selected colors mentioned above, the magnetized points being intended to produce images or parts thereof which must appear on the carrier in the same color and all having the same intensity of magnetization;

then, depositing on said surface a first powdery developer whose shade is that of the first of said colors;

eliminating said first developer from the magnetized points, whose magnetization intensities are less than $J_1$;

repeating said depositing operation on said surface with, in proper sequence, each of (p−1) other powdery developers of different shades, each of said depositing operations being immediately followed by a developer removal operation, except for the last depositing operation, the magnetized points involved in said removal operation being, in the course of each of said (p−2) removal operations, the points whose intensity of magnetization is less than $J_2$, $J_3$ . . . $J_{p-1}$, respectively, so that after the last depositing operation, each magnetized point having an intensity of magnetization equal to $J_1$ is coated with p superimposed layers of said developers, each magnetized point having an intensity of magnetization equal to $J_2$ is coated with (p−1) superimposed layers of said (p−1) other developers, and so forth . . . each magnetized point whose intensity of magnetization is equal to $J_p$ then being coated only with a single layer of the $p^{th}$ developer, and finally performing a total transfer of all these developer layers to the print carrier so as to produce a powder image thereon which consists of a plurality of pinpoint spots, each of which results from the transfer of the developer layers which have been deposited onto each one of said magnetized points and having the color of the developer which, just before the transfer operation, was in direct contact at that point with the surface of the recording element.

The invention also relates to a magnetographic printing machine for carrying out the above mentioned process. This machine comprises a recording element provided with a magnetic recording surface, a plurality of magnetic heads controlled by electric pulses and designed to magnetize the recording surface in response to the electric pulses in a direction perpendicular to said surface so as to produce a group of magnetized points thereon which form a latent magnetic image, drive means for bringing about a relative displacement between the recording element and the magnetic heads, a pulse generator designed to emit electrical pulses selectively to the heads, and an applicator means to enable a powdery developer to be deposited onto said recording surface, the developer remaining applied only to the magnetized points of the surface to produce a powder image, the machine being characterized in that, the developer includes particles whose shade is of the first of the p previously selected colors, and also comprises:

electric current calibrating means inserted between the pulse generator and each of the heads so as to allow each of the current pulses emitted by said generator to be adjusted selectively to one of the p predetermined amplitude values and thus to produce on the recording surface a latent magnetic image whose magnetized points exhibit the same magnetic polarity but have different intensities of magnetization valued as $J_1$, $J_2$, $J_3$ . . . $J_p$, such that $J_1>J_2>J_3 \ldots >J_p$, each of said values being associated with each one of said p values, the magnetized points, designed to produce image parts which, on the print carrier, must appear in the same color, all having the same intensity of magnetization;

(p−1) other applicator means distributed along the path followed by the recording surface in the course of its displacement, each of said applicator means capable of depositing onto each magnetized point of said surface a layer of each one of the other (p−1) powdery developers, each of said (p−1) developers having as a shade one of said colors other than the first color;

(p−1) retouching means, each fitted downstream, in relation to the direction of surface displacement, to each of said applicator means, except the last one, the first of said retouching means being designed so as to remove the first developer from the magnetized points whose intensity of magnetization is less than $J_1$, the second retouching means being designed so as to remove the second developer from the magnetized points with an intensity of magnetization less than $J_2$, and so forth; and a transfer means fitted downstream to the last applicator means to transfer to the print carrier all the various developer layers which cover the magnetized points of the surface when these points move past said last applicator means.

BRIEF DESCRIPTION OF THE DRAWINGS

Other features and advantages of the invention will be more readily understood from the consideration of the ensuing description offered by way of non-limitative example, and from the accompanying drawings, in which:

FIG. 2 shows a method of constructing a printing machine for implementing the printing process of the invention;

FIG. 3 is a view showing the principle of transverse magnetization of the recording element forming part of the machine of FIG. 2;

DESCRIPTION OF THE PREFERRED EMBODIMENTS

Figures 1A, 1B, 1C, 1D, 1E, 1F, 1G:
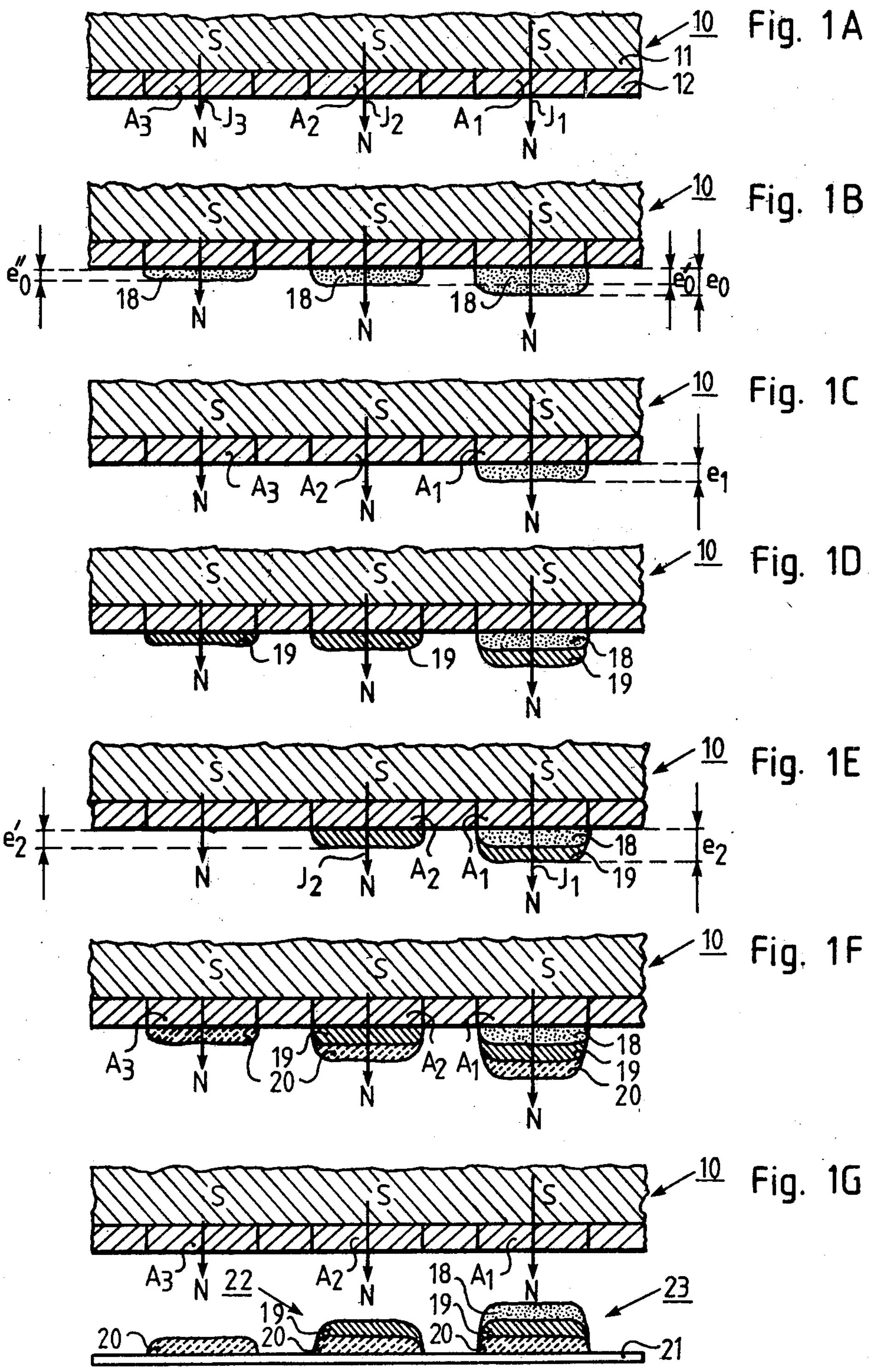
FIG. 1A through 1G show the various phases of the magnetographic printing process according to the invention.

FIG. 1A shows, in an enlarged section, a known type of recording element (10) which can be used for carrying out the process of the invention. It is assumed in the example being described that this magnetic recording element is of a type similar to that described and shown in French Pat. No. 2,402,921, corresponding to U.S. Pat. No. 4,205,120 and that it comprises a carrier (11) composed of a material with a high magnetic permeability such as iron or mild steel, said carrier being coated with a layer of highly coercive magnetic material such as, for example, a nickel-cobalt magnetic alloy. In the method for implementing the printing process of the invention, this recording element (10) is magnetized transversely by means of one or several recording heads (13) of the same type as that shown in FIG. 3.

Now, referring to FIG. 3, it can be seen that this recording head (13) includes a magnetic core (14) around which is wound a winding (E) connected to an electrical excitation circuit, which will be described later. This magnetic core (14) is substantially U-shaped and has a profile such that it has at its opposite ends a recording pole (15) and a flux-shutoff pole (16). As can be seen in FIG. 3, these two poles are located near the surface of the magnetic layer (12) so that a closed magnetic circuit is formed by the carrier (11) and the two areas (100) and (101) enclosed by said core and said carrier located plumb against the poles (15) and (16), respectively. It should be noted here that, although in the case illustrated in FIG. 3, the poles (15) and (16) are located near the surface of the magnetic layer (12), a different arrangement could be used in which these two poles would be placed in direct contact with said surface.

FIG. 3 also shows that the width (d) of the recording pole (15) is very small in relation to the width (D) of the flux-shutoff pole (16). Under these conditions, if an electric current with an intensity (I) flows through the coil, this current generates inside the magnetic core (14) a magnetic flux whose mean force line is represented by a broken line (17). In the portion of the magnetic layer (12) located in the area (100) of the recording pole (15), the magnetic field is perpendicular to the surface of said layer (12), so that in this portion the magnetization of the magnetic layer (12) does occur transversely. In this portion, the magnetic field generated by the head (13) is greater than the saturation field of the magnetic layer (12) and, therefore, causes the appearance in said portion of a practically pinpoint magnetized zone, usually termed a magnetized point, said magnetized zone continuing to exist even if no more current flows through the coil (E). On the contrary, in the portion of the magnetic layer (12) located in the area (101) of the flux-shutoff pole (16), because the width of said pole is much greater than that of the recording pole (15), the value of the magnetic field generated by the head (13) is much lower than that of the saturation field of the magnetic layer (12), so that the flux-shutoff pole (16) can cause neither the formation of a magnetized zone in the layer (12) nor a modification of the magnetized zones already formed in said layer. Under these conditions, it is possible to magnetize the magnetic layer (12) so that the magnetized zones thus formed form a latent magnetic image with a given configuration, e.g., the configuration of a character. As an example, in FIG. 5 a group of magnetized zones A is shown arranged as a rectangular matrix with seven lines and five columns, and distributed within said matrix so as to form the image of the character "H".

It should be noted that the spacing pitch (P) for the lines and columns of this matrix is at least equal to the dimension (L) of a magnetized zone. Under these conditions, it has been found that even in the case where this pitch (P) was substantially equal to said dimension (L), the magnetizations exhibited by two adjacent magnetized zones had practically no influence on each other. It will be recalled that in previously known processes the latent magnetic image which has thus been produced on the surface of the recording element is then developed by depositing on the surface of the magnetic layer (12) a powdery developer containing finely divided particles, each consisting of a thermoplastic organic resin in which a pigment and some magnetic particles have been incorporated. Thereupon, the surface of the magnetic layer (12) is subjected to a retouching operation which enables the elimination of the developer particles which are in excess on said surface, so that at the end of the operation only the magnetic zones of said layer remain coated with a developer film, thus forming on the surface of the layer (12) a powder image whose configuration corresponds to that of the magnetized zones. This powder image is then transferred to a print carrier usually consisting of a paper strip. In the present invention, on the contrary, in order for the image produced on the print carrier to appear in previously selected p colors, p being a whole integer at least equal to 2, the following process is used, the various phases of which will now be described with reference to FIG. 1A through 1G.

In the phase shown in FIG. 1A, the recording element (10) is magnetized so as to produce on its surface some magnetized zones, all of which are of the same size and have magnetizations that are all oriented in the same direction. In FIG. 1A, only three of these zones, designated, respectively, as A1, A2, and A3, have been shown for the sake of simplicity, but it will be understood that the number of these magnetized zones can be absolutely anything, subject only to the physical constraints of the apparatus. FIG. 1A likewise shows the magnetic polarities north (N) and south (S), as well as the respective magnetizations $J_1$, $J_2$ and $J_3$ of the zones A1, A2 and A3, each of said magnetizations being indicated by an arrow having a length which is proportional to the value of said magnetization. It can be seen in FIG. 1A that all the magnetizations $J_1$, $J_2$ and $J_3$ of the respective zones A1, A2 and A3 are indeed oriented in the same direction, but have different values, the magnetization $J_2$ in this Figure having, in fact, a higher value than the magnetization $J_3$, but a lower value than the magnetization $J_1$. Generally, all the magnetizations with the same value are exhibited by the magnetized zones designed to form, on the print carrier, images or parts of images which must appear in the same predetermined value. However, the magnetization of these zones has a value which differs from that of the magnetization of the zones designed to produce on the print carrier images or parts of images that must appear in a different predetermined value. Thus, there are as many magnetization values as there are different colors in the image or images to be produced on the print carrier, i.e., in the most general case, p magnetization values $J_1$, $J_2$, $J_3 \ldots J_p$. Thus, for example, the zones A1, A2 and A3, all of which have similarly oriented magnetizations, but with different values, are intended to produce on the printing paper three pinpoint spots, all with different colors. For example, let it be assumed that the magnetized zone A1 is designed to produce a red pinpoint spot, that the magnetized zone A2 is intended to produce a black pinpoint spot, and that the magnetized zone A3 is used to form a yellow pinpoint spot. In the example of FIG. 1A, it will also be assumed that the values of the magnetizations $J_1$ and $J_2$ have been selected previously and are such that $J_1=1.6\ J_3$ and $J_2=1.25\ J_3$. In order to produce these three magnetized zones A1, A2 and A3 three identical recording heads can be employed, of the type shown in FIG. 3 and which are energized with currents flowing in the same direction through each of the windings thereof, but having different intensities I1, I2, and I3 such that these currents cause the production, in the recording elements, of magnetized zones of magnetization $J_1$, $J_2$ and $J_3$, respectively.

After the recording element has been magnetized in the manner described above, a first powdery developer having a shade which is one of the previously selected p colors is deposited on the surface of said element. In the example being described, it will be assumed that the color of this first powdery developer is red. However, this first developer, which is brought into contact with the entire surface of the recording element (10), is only attracted by the magnetized zones of said element, so that this developer is allowed to exist only on these magnetized zones, e.g., by depositing the developer on the recording element in such a way that at the time the developer is applied to said element, each developer particle is subjected to the action of a gravitational force oriented in a direction opposite to that of the magnetic attraction exerted by the magnetized zones. Each of these magnetized zones is then coated, as shown in FIG. 1B, with a layer (18) of the first developer. The higher the value of the magnetization of the magnetized zone on which said layer is deposited, the greater the importance of the thickness of said layer.

Indeed, it should be noted that the force with which each of the developer particles that have been deposited on the same magnetized zone of the recording element (10) is attracted depends not only upon the magnetization value of said zone and upon the distance (y) between each particle of said zone, but also upon the physical characteristics of said developer, such as the granulometric state and the percentage of magnetic particles of said developer. Under these conditions, the magnetic force $F_m$ exerted by each of the magnetized zones on each of the developer particles, which have been deposited on said zone, varies as a function of the distance (h) between said particle and said zone, according to a variation law shown by the curves on the diagram of FIG. 6. The broken-line curve (60) represents the variations, as a function of (h), of the magnetic force exerted by a magnetized zone of strong magnetization, such as A1. The solid-line curve (61) represents the variations, as a function of (h), of the magnetic force exerted by a magnetized zone of average magnetization, such as A2, and the dot-and-dash line curve (62) represents the variations, as a function of (h), of the magnetic force exerted by a magnetized zone of weak magnetization, such as A3.

Figure 6:
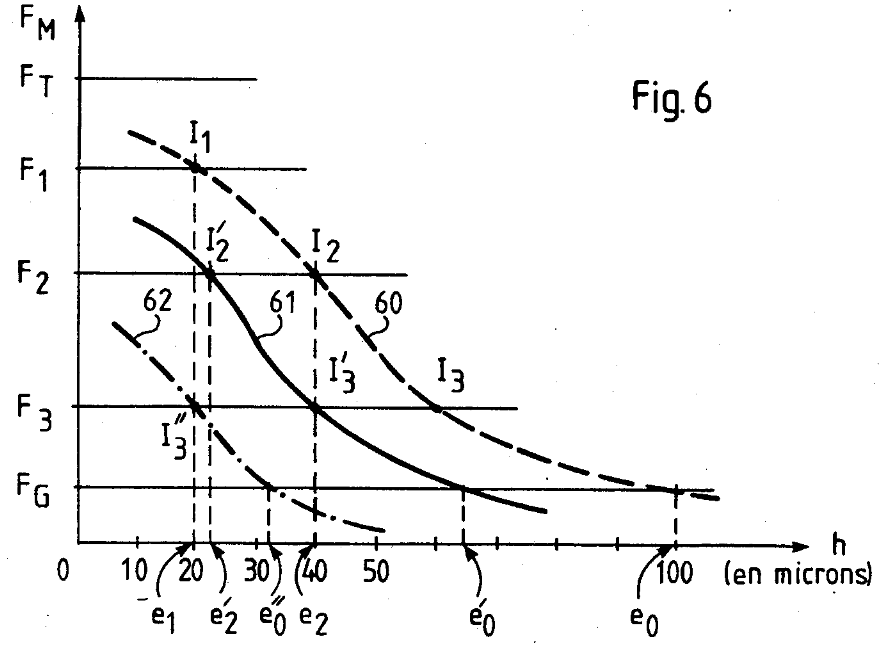
FIG. 6 shows curves illustrating the variations of the magnetic attractive force exerted by each magnetized point formed on the recording element, which is part of the machine of FIG. 2.

FIG. 6 only shows three curves corresponding to the three values $J_1$, $J_2$ and $J_3$ of the magnetizations of the zone which are intended to produce on the print carrier an image containing three colors in the example being described. However, it will be easily understood that in the most general case there are as many curves as colors in the image to be printed, that is, p curves if said image includes p colors, each of said p curves corresponding to one of the p magnetization values $J_1, J_2, J_3 \ldots J_p$ of the magnetized zones.

FIG. 6 also shows the value $F_G$ of the gravitational force mentioned earlier, said force being exerted on each developer particle when said developer is applied to the recording element surface. Therefore, there is for each magnetized zone a special value of the distance (h) for which said gravitational force $F_G$ is equal to the magnetic attractive force exerted by said magnetized zone, said special value thus determining the thickness of the developer layer that continues to exist on said zone. Thus, in the example being described, said special value for each of the magnetized zones A1, A2 and A3 is equal to respectively, $e_o$, $e'_o$ and $e''_o$ so that the thickness of the developer layer which continues to exist on zone A1 is equal to $e_o$, that of the layer which continues to exist on zone A2 is equal to $e'_o$, and that of the layer which continues to exist on zone A3 is equal to $e''_o$. In the case shown in FIG. 6, these thicknesses have approximately the following values: $e_o=100$ microns, $e'_o=65$ microns, $e''_o=33$ microns.

After the magnetized zones A1, A2 and A3 have thus been coated with a first developer layer (18), the recording element (10) is then subjected to a retouching operation intended not only to eliminate the residual particles of the first developer continuing to exist outside the magnetized zones of the recording element (10), but also to remove all the first developer particles on the magnetized zones whose magnetization is lower than the value of the strongest magnetization, said magnetized zones being, in the example being described, the zones A2 and A3 whose respective magnetizations $J_2$ and $J_3$ each have a lower value than the magnetization $J_1$ of the zone A1. During this retouching operation, which can be performed by magnetic, electrostatic, or pneumatic means (suction or air blowing), each developer particle that continues to exist on the recording element surface is subjected to a constant force having a value $F_1$, which is exerted against the magnetic force $F_m$ which keeps each particle applied to the magnetized zone on which it has been deposited. The value $F_1$ of said force is shown on the diagram of FIG. 6, said value being selected so that the ordinate line $F_1$ intersects only the curve representing the variations, as a function of the distance (h), of the magnetic force exerted by the magnetized zones with the strongest magnetization, said curve in the example being described being curve (60). The diagram of FIG. 6 also designates by $e_1$ the abscissa of the point of intersection $I_1$ of curve (60) with the ordinate line $F_1$. Thus it can be seen that for the developer particles that have been deposited on each of the magnetized zones of stronger magnetization, such as $A_1$ and which are located at a shorter distance than $e_1$, the magnetic force exerted by said zone is greater than the retouching force $F_1$, so that these particles will still be extant on said zone. In contradistinction, for the particles that have been deposited on each of the magnetized zones of stronger magnetization and which are located at a shorter distance than $e_1$, the magnetic force exerted by said zone is smaller than the retouching force $F_1$, so that these particles will be eliminated from said zone. Consequently, a first developer layer with a thickness practically equal to e will still be extant on each of the magnetized zones of stronger magnetization (such as $A_1$). As for the first developer particles which have been deposited on each of the other magnetized zones (such as $A_2$ and $A_3$), they will be totally eliminated from these zones, inasmuch as the magnetic force exerted by each of these zones is always smaller than the retouching force $F_1$. Under these conditions, only the magnetized zones of stronger magnetization (such $A_1$) will appear coated with a first developer layer having a thickness $e_1$, as can be seen in FIG. 1*c*.

The developer depositing and retouching operations which have just been described are then repeated with a second powdery developer whose shade is one of the p selected colors, but different from that of the first developer. In the example being described, it will be assumed that the color of the second powdery developer is black. The second developer is deposited under the same conditions as those which have been described for the first developer so that, at the end of the depositing operation, each of the magnetized zones of the recording element (10) is coated with a second developer layer (19) as shown in FIG. 1D. On the magnetized zones with a stronger magnetization, such as zone A1, said layer (19) is thus superimposed on the layer (18) of the first developer. Thereupon, the recording element (10) is subjected to a second retouching operation, similar to the one previously described, but with a constant force of value $F_2$, which is smaller than the force of the first retouching operation. The value $F_2$ of this force is shown on the diagram of FIG. 6 and it is so selected that the ordinate line $F_2$ intersects at $I_2$ and $I'_2$ only the two curves (60) and (61), one of which represents the variations, as a function of the distance (h), of the magnetic force exerted by the magnetized zones of the strongest magnetization (i.e., magnetization $J_1$), and the other the variations, as a function of (h), of the magnetic force exerted by the magnetized zones, whose magnetization has the value $J_2$ in the sequence of successive magnetization values $J_1, J_2, J_3 \ldots J_p$. Thus, it can be seen in FIG. 6 that there is an $e_2$ value of the abscissa (h), for which the magnetic force exerted by each of the magnetized zones of $J_1$ magnetization is equal to the force $F_2$, and that there is also an $e'_2$ value of the abscissa (h), for which the magnetic force exerted by each of the magnetized zones of $J_2$ magnetization is equal to said force $F_2$. Without once again going into every detail of the explanations set forth above, it will be understood that the value $e_2$, as can be seen in FIG. 1E, represents the total thickness of the accumulations formed by the superimposition of layers (18) and (19) on each of the magnetized zones of magnetization $J_1$, and that said value $e'_2$ represents the thickness of the second developer layer (19) on each of the magnetized zones of magnetization $J_2$.

Thus, the depositing and retouching operations are repeated as many times as there are colors in the image to be printed. Therefore, in the example being described, where said image is made up of three colors, there is deposited on each of the magnetized zones of the recording element a third powdery developer whose shade differs from that of the two previously deposited developers. In the example being described, in which the number of colors equals three, said third powdery developer is therefore the last one to be deposited onto the recording element (10). It will be assumed here that the color of the third powdery developer is yellow. Once this depositing operation is completed, each of the magnetized zones of element (10) is coated, as shown in FIG. 1F, with a third developer layer (20) which is superimposed on the magnetized zones whose magnetization is greater than $J_3$ (i.e., on zones A1 and A2). Thereupon, the recording element (10) is subjected to a third retouching operation similar to the preceding two, the value $F_3$ of the force generated during said third operation being smaller than the force, $F_2$, generated during the second retouching operation. The value $F_3$ of said retouching force is shown on the diagram of FIG. 6 and is chosen so that the ordinate line $F_3$ intersects all the curves representing the variations, as a function of (h), of the magnetic forces exerted by the magnetized zones. It should be noted here, however, that in view of the fact that, since in the example being described the third developer is the last to be deposited onto the magnetized zones of the recording element (10), said last retouching force is designed on the one hand, to remove the developer particles still extant outside the magnetized zones of the recording element (10) and, on the other hand, to limit the thickness of the third developer layer which has been deposited on these zones. This last retouching operation, which is different from the preceding retouching operations, because it does not result in the total elimination of the particles that are present on some of the magnetized zones, is therefore not a particle elimination operation on certain magnetized zones of the recording element (10).

In the example shown in FIG. 6, it will be understood that the thickness of the total layer resulting from the three developers still extant on each magnetization zone $J_1$ is obtained from the abscissa $e_3$ of the point $I_3$ where the ordinate line $F_3$ intersects curve (60); that, likewise, the thickness of the total layer from two developers still extant on each magnetization zone $J_2$ is obtained from the abscissa $e'_3$ of the point $I'_3$ where the ordinate line $F_3$ intersects curve (61); and that the thickness of the third developer layer still extant on each magnetizing zone $J_3$ is obtained from the abscissa $e''_3$ of the point $I''_3$ where the ordinate line $F_3$ intersects curve (62).

It should also be noted that the powdery developers used in the process of the invention have practically the same granulometric state, the same coercive field, the same saturation magnetization, the same density, and the same melting point, so that the magnetic force $F_m$ exerted by each of the magnetized zones on any of the particles located at the same distance (h) varies only as a function of the magnetizing value of said zone.

Once the last developer has been deposited on the recording element and the last retouching operation has been performed, a strip of paper (21) intended to be printed is introduced, as shown in FIG. 1G, either in the vicinity of said recording element (10) or in contact with said recording element (10) so that the transfer to said paper strip of the developer layers which are present on the magnetized zones of said element (10) can be performed. Said transfer can, moreover, be effected in a known manner either by applying pressure or by magnetic or electrostatic means. However the conditions of said transfer are such that nearly all of the developer layers are transferred to the paper strip (21). Thus, in the example shown in FIG. 1G, the third developer layer (20) which was present on zone A3 is transferred to the strip (21) where it forms a yellow accumulation consisting of said third developer. Likewise, the layers (19) and (20) of the second and third developers, which were superimposed on the zone A2, are again present on the paper and form a pile (22) in which the second developer layer (19) then covers the third developer layer (20). Finally, the layers (18), (19) and (20) of the first, second, and third developers, which were superimposed on the zone A1, are again present on the paper and form a pile (23) consisting of the first developer layer (18) which covers the second developer layer (19) which, in turn, covers the third developer layer (20).

The developer layers which have thus been transferred to the paper strip (21) are then subjected to a fixing operation which is performed at a temperature which enables the three developers to reach a viscous, but non-liquid state, thus preventing the various developers making up the piles (22) and (23) from mixing. Under these conditions, following said fixing operation, the layer (20) of the pile (22) is concealed by the layer (19) which then forms on the paper a pinpoint spot having the shade of the second developer, that is, black in the example being described. Similarly, the layers (19) and (20) of the pile (23) are concealed by the layer (18), which then forms on the paper a pinpoint spot having the shade of the first developer, that is, red in the example being described. Finally, the single layer (20) of the third developer forms, when fixed on the paper, a pinpoint spot having the yellow shade of said third developer.

FIG. 2 shows a magnetographic printing machine for producing color printing according to the printing process described herein. The machine shown in this Figure comprises a magnetic recording element in the shape of a magnetic drum (10) similar to that described and shown in the French Pat. No. 2,402,921 noted above, said drum being driven by an electric motor (25) in the direction of arrow R. The magnetization of the magnetic layer of said drum is ensured by a group of n magnetic heads 13-1 through 13-n arranged side by side and aligned parallel to the axis of rotation of the drum. Said heads, of the type shown in FIG. 3, are excited selectively by electric pulses emitted by pulse generator (26) and applied to the windings of said heads by means of a current-calibrating means (27) whose structure is shown in detail in FIG. 4.

Figure 4:
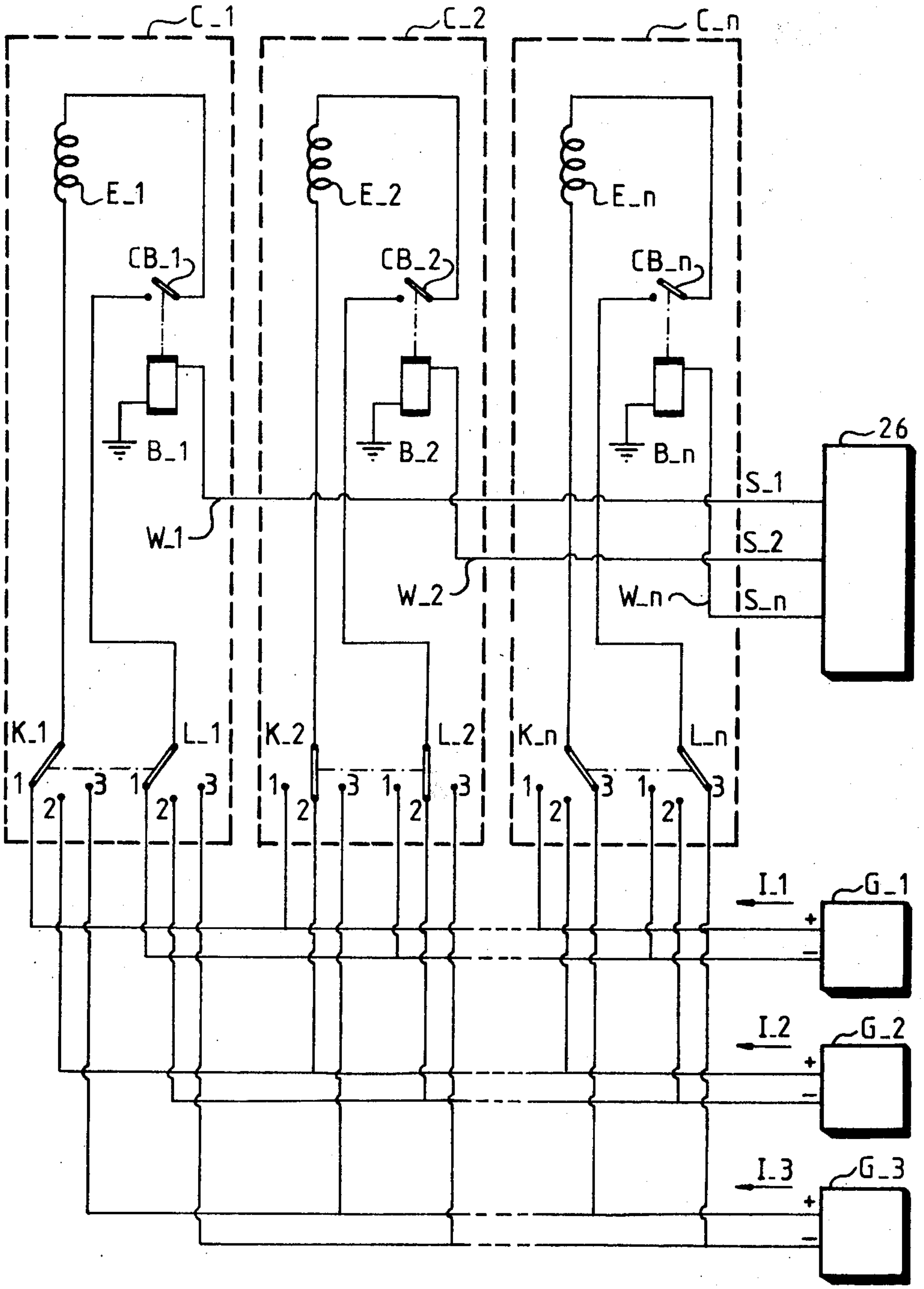
FIG. 4 shows a diagram of the electric circuit used to control the various recording magnetic heads of the machine of FIG. 2.

Now, referring to FIG. 4, each of the windings E-1 through E-n of the magnetic heads 13-1 through 13-n is connected at one end to the moving contact blade of a corresponding one of n first stepping switches K-1 through K-n and, at the other end, to the moving contact blade of a corresponding one of n second stepping switches L-1 through L-n by means of a corresponding one of n contacts CB-1 through CB-n. Each of the contacts CB-1 through CB-n is controlled by a corresponding one of n relay coils B-1 through B-n.

FIG. 4 shows that in the example described each of the stepping switches K-1 through K-n and L-1 through L-n contains three input pins or terminals designated by 1, 2 and 3 in the drawing. The input terminal 1 of each of the first switches K-1 through K-n is connected to the positive terminal (+) of a first current generator G1, while the input terminal 1 of each of the second switches L-1 through L-n is connected to the negative terminal (−) of said generator G1. The input terminal 2 of each of the first switches K-1 through K-n is connected to the positive terminal (+) of a second current generator G2, while the input terminal 2 of each of the second switches L-1 through L-n is connected to the negative terminal (−) of said generator G2. Finally, the input terminal 3 of each of the first switches K-1 through K-n is connected to the positive terminal (+) of a third current generator G3, while the input terminal 3 of each of the second switches L-1 through L-n is connected to the negative terminal (−) of said generator G3.

FIG. 4 shows that the moving contact blades of the switches K-1 and L-1 are coupled mechanically or ganged, so that they can be placed simultaneously on the same input terminal. The same is true for the moving contact blades of the switches K-2 and L-2 . . . K-n and L-n. As can be seen in FIG. 4, the relay coils B-1 through B-n can be excited by electric pulses supplied at the corresponding outputs S1 through Sn of the pulse generator (26), each of said coils B-1 through B-n being connected for that purpose to each one of outputs S1 through Sn by means of a corresponding one of n conductors W1 through Wn.

The structure of the pulse generator (26) will not be described here, since this type of structure is known. It will be assumed here that, in the example described, the structure of pulse source (26) is similar to that of the recording control device shown in French Pat. No. 2,443,335 corresponding to U.S. application Ser. No. 89,039 of J. Eltgen, et al., filed Oct. 29, 1979, and assigned to the assignee of the present invention, now U.S. Pat. No. 4,312,045.

Where the machine of FIG. 2 is used to print characters made up of points located inside a rectangular matrix comprising seven lines and five columns, for the line of said matrix extending in a direction parallel to the axis of rotation of the drum (10), the latent magnetic image required for printing a character is obtained by exciting selectively five adjacent heads chosen from the group of magnetic heads 13-1 through 13-n seven different times. Said excitation is effected by means of pulses delivered at successive instants $t_1$, $t_2$, $t_3$, $t_4$, $t_5$, $t_6$ and $t_7$ at five of the corresponding outputs S1 through Sn of the pulse generator (26). Thus, for example, in order to form the latent magnetic image required for printing the character G by means of the magnetic heads 13-1 through 13-5, the pulse generator (26) delivers at instant $t_1$ a pulse at each of its outputs S2 through S4; at instant $t_2$ a pulse at each of its outputs S1 and S5. at instant $t_3$ a pulse at its output S5; at instant $t_4$ a pulse at each of its outputs S1, S2, S3 and S5; at instant $t_5$ a pulse at each of its outputs S1 and S5; at instant $t_6$ a pulse at each of its outputs S1 and S5; and, finally, at instant $t_7$ a pulse at each of its outputs S2 through S4.

Figure 5:
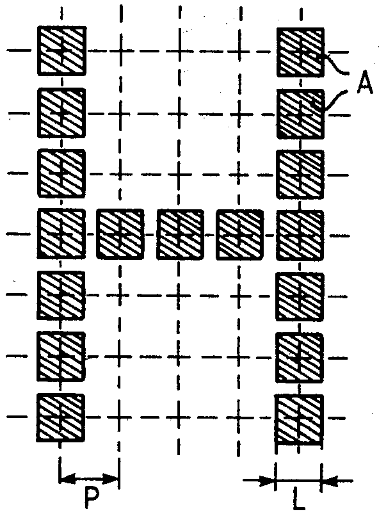
FIG. 5 is a view of the arrangement of the magnetized points which have been produced on the recording element to form the latent magnetic image of a character.

This can perhaps be best visualized by drawing a rectangular matrix of seven lines and five columns, is shown in FIG. 5, labeling the lines $t_1$ through $t_7$ from the top to bottom and the columns $S_1$ to $S_5$ and shading a zone area for each delivered pulse on the appropriate time line and column.

The switches K-1 through K-n and L-1 through L-n are used to determine the amplitude of the magnetizations of the magnetized zones on the drum (10), said amplitude conditioning the color of the pinpoint spot which will be formed subsequently on the paper by each of the magnetized zones. To accomplish this, the first switches K-1 through K-n, the second switches L-1 through L-n, the relay contacts CB-1 through CB-n, and the windings E-1 through E-n of the magnetic heads are distributed as shown in FIG. 4 so as to form n circuit portions C-1, C-2, . . . C-n, each associated with a corresponding one of the n heads 13-1 through 13-n, each of said portions comprising, in series, a corresponding one of the first switches K-1 through K-n, a corresponding of the windings E-1 through E-n, a corresponding one of the relay contacts CB-1 through CB-n, and a corresponding one of the second switches L-1 through L-n.

Where the two switches of the same circuit portion are placed in position 1, that is, when the moving contact blade of said two switches (say K1, L1 for example) is placed at the input terminal (1), the current flowing through the winding of the head associated with said circuit position when the relay contact, which is in series with said winding, is closed, is the current generated by the generator G1, said current having an intensity $I_1$. If these two switches of the same circuit portion are placed in position 2, the current flowing through said winding when said relay contact is closed, is the current generated by the generator G2, said current having an intensity $I_2$. If these two switches of the same circuit portion are placed in position 3, the current flowing through said winding when said relay contact is closed, is the current generated by the generator G3, said current having an intensity $I_3$. Thus, for example, if the two switches K-n and L-n are placed in position 3 at the moment when a pulse is applied to the output Sn of the Generator (26), said pulse, upon arrival, causes the temporary excitation of coil B-n. The coil B-n then closes its contact B-n for a brief instant so that a direct current with intensity $I_3$ flows momentarily through the closed circuit made up of generator G3, switch K-n in position 3, winding E-n of head 13-n, closed contact CB-n, and switch L-n in position 3. As a result, said magnetic head 13-n forms on the surface of the drum (10) a practically pinpoint magnetized zone having a magnetization $J_3$ which is still extant following the disappearance of the current with intensity $I_3$ which flows through the winding E-n.

It should also be noted that the current generators G1, G2 and G3 are set to generate currents with intensities $I_1$, $I_2$ and $I_3$, respectively such that the magnetized zones produced on the surface of the drum (10) by these current with magnetizations of predetermined values of $J_1$, $J_2$ and $J_3$, respectively.

It will be understood that under these conditions, it is desired, for example, to obtain on the drum (10) a latent magnetic image in the magnetized zones having a magnetization $J_1$, it suffices to place the corresponding switches K and L on the position 1 prior to excitation of the magnetized heads required for the production of said image. Similarly, if it is desired that the magnetized zones of said image have a magnetization $J_2$, it suffices to place said switches on position 2 before these heads are excited. Finally, if it is desired that the magnetized zones of said image to have a magnetization $J_3$, it suffices to place said switches in position 3 before exciting said heads. The switches K-1 through K-n and L-1 through L-n can, moreover be positioned either manually through the operator prior to any printing operation, or fully automatically through a known type of operating means excited by the same control unit which controls the operation of the pulse generator (26). It is even possible, depending on the case and the application, to place some of the switches K-1 through K-n and L-1 through L-n in a prespecified position (e.g., position 2), while the other switches are placed in a different position. This arrangement enables, for example, during the printing of a line of characters, some characters to be printed in one color, while the other characters of said line are printed in a different color.

It should be mentioned that the current-calibrating means (27) shown in FIG. 2 in the example described is made up of a group of relay coils B-1 through B-n and their contacts CB-1 through CB-n, switches K-1 through K-n and L-1 through L-n, and generators G1 through G3, all these elements being interconnected in the manner shown in FIG. 4. However, it should be noted that, although the calibrating means of FIG. 4 contains only three current generators and switches with only three positions, said means when used in a machine designed to print images in p colors, is composed of p current generators G1, G2 . . . Gp and switches K-1 through K-n and L-1 through L-n, each having p positions. Under these conditions, the intensities $I_1, I_2, I_3 \ldots I_p$ generated by each one of the p generators G1, G2, G3 . . . Gp are adjusted such as to cause magnetized zones to be formed in the recording element with magnetizations $J_1, J_2, J_3 \ldots J_p$, respectively.

Now, reverting to FIG. 2, it will be seen that the printing machine designed according to the teachings of the invention also includes a first applicator means (40) of known construction, which enables particles of a first powdery developer contained in a tank (49) to be applied to the surface of the drum (10). In the example described, it is assumed that the color of said first developer is red. This first applicator means (40) is designed to deposit on each of the magnetized zones of the drum (10) a first developer layer approximately 100 microns thick for the magnetized zones of magnetization $J_1$, to 65 microns for the magnetized zones with magnetization $J_2$, and to 33 microns for the magnetized zones with magnetization $J_3$. It is assumed that this applicator means (40) is preferably of the same type as those described and shown in French Pat. Nos. 2,408,462 corresponding to U.S. Pat. No. 4,246,588 and 2,425,941, corresponding to U.S. Pat. No. 4,230,069 said device including on the one hand a rotating magnetic element which brings the developer tank (49) particles near the surface of the drum and, on the other, a deflector inserted between said element and the drum so as to form a trough in which are accumulated the particles collected by said deflector. Said deflector leaves between itself and the drum a very small opening of about 1 millimeter, through which pass the particles which have come to be applied to the surface of said drum. The magnetized zones of the drum (10), which have thus been coated with a first developer layer, then move past a first retouching device designed to eliminate the first developer particles which have been deposited on the magnetized zones of magnetizations $J_2$ and $J_3$. This retouching device may be magnetic, electrostatic, or pneumatic. In the example described, the retouching device (41) is assumed to be of the type described and shown in French Pat. No. 2 411,435 corresponding to U.S. application Ser. No. 965,412 of J. J. Binder, filed Nov. 25, 1980, and assigned to the assignee of the present invention, now abandoned in favor of continuation application Ser. No. 210,312, filed Nov. 12, 1980, now U.S. Pat. No. 4,348,684, and which is adjusted so as to leave on the zones of magnetization $J_1$ only a first developer layer approximately 20 microns thick. The magnetized zones of the drum (10) which have moved past the retouching device (41) then move past a second applicator means (42) of a type similar to that of the first applicator means, said second applicator means enabling particles from a second powdery developer, which is black in the example described and is contained in a tank (50) to be deposited onto the drum (10). Said second applicator means (42) is designed to apply a second developer layer, on the one hand, to each of the magnetized zones with magnetizations $J_2$ and $J_3$—said layer being approximately 65 microns thick for the zones of magnetizations $J_2$, and 33 microns for the zones of magnetization $J_3$—and, on the other hand, on each of the first developer layers already applied the total thickness of the thusly superimposed layers of the two developers on the zones of magnetization $J_1$ being approximately 100 microns. Thereupon, the magnetized zones of the drum (10) move past a second retouching device (43) similar to the first retouching device (41) and fitted downstream to the second applicator means (42) in relation to the direction in which the drum is rotated. Said second retouching device (43), intended to dislodge the second developer particles which have been deposited onto the magnetized zones of magnetization $J_3$ is calibrated so as to leave extant on the zones of magnetization $J_2$ only a second developer layer approximately 33 microns thick and, on the zones of magnetization $J_1$, a composite layer made up of two superimposed layers of first and second developers and approximately 40 microns thick. The magnetized zones of the drum (10) which have moved past the second retouching device (43) then move past a third coating device (44) which, being of a type similar to that of the previous ones, enables particles from a third powdery developer, yellow in color and contained in a tank (51), to be deposited onto the drum (10). Said third coating device (44) is designed to deposit a third developer layer onto each of the zones of magnetization $J_3$, the thickness of said layer being approximately 33 microns, as well as onto each of the second developer layers already deposited onto each of the zones of magnetizations $J_1$ and $J_2$ the total thickness of the three layers so superimposed on the zones of magnetization $J_1$ being approximately 100 microns, while the total thickness of the two layers so superimposed on the zones of magnetization $J_2$ is approximately 65 microns. The magnetized zones of the drum which have been so coated then move past a third retouching device (52), which is intended essentially to dislodge the developer particles still extant on the drum outside the magnetized zones. In the example described, said third retouching device (52) is calibrated so that the zones of magnetization $J_3$ which have moved past this device (52), become coated with a third developer layer approximately 20 microns thick, while the zones of magnetization $J_2$, which have moved past this device (52) become coated with a composite layer made up of two superimposed layers of second and third developers and approximately 40 microns thick. Finally, the zones of magnetization $J_1$, which have moved past this device (52) become coated with a composite layer made up of three superimposed layers of three developers and approximately 60 microns thick.

The magnetized zones of the drum (10) which have been subjected to all these depositing and retouching operations are then brought into contact with a paper strip (21) which is applied to the drum (10), as shown in FIG. 2, under the action exerted by a pressure roller (45). The force with which the strip (21) is applied against the drum (10) by the pressure roller (45) can be adjusted by known means (not shown) so as to cause a total transfer of all the developer layers still extant on the drum (10) following movement past the retouching device (52). The value $F_t$ of said force is, as shown in FIG. 6, greater than the $F_1$ value mentioned above so that, finally, all the composite layer which was present on each of the magnetized zones of magnetization $J_1$, is transferred to the paper, thus forming pinpoints spots approximately 60 microns thick and having the red color of the first developer. Likewise, the entire composite layer, which was present on each of the magnetized zones of magnetization $J_2$, is transferred to the paper, thus forming pinpoint spots approximately 40 microns thick and having the black color of the second developer. Finally, the entire thrid developer layer which was present on each of the magnetized zones of magnetization $J_3$, is transferred to the paper, thus forming pinpoint spots approximately 20 microns thick and yellow in color.

The machine shown in FIG. 2 also includes a developer fixing means (46) under which passes the paper strip (21) once the just-described transfer operation is completed. Said fixing means (46), composed of an electrically heated element in the example described is intended to fix permanently the developers which have been transferred to the paper strip (21). It should be noted that said fixing device (46) is adjusted so that these developers are not subjected to any fusion, but only to a softening sufficient to ensure their fixation onto the paper. Under these conditions, there is no risk at all that the colors in the piles of developers which, such as (22) and (23), include several developer layers of different shades, will mix. Thus, each of the developer piles such as (22) once cooled on the paper, forms a pinpoint spot having the shade of the second developer. Likewise, each of the developer piles, such as (23), after it has cooled on the paper, forms a pinpoint spot having the shade of the first developer. Finally, each of the piles composed only of a single layer of the third developer forms after it has cooled on the paper, a pinpoint spot having the shade of said third developer.

The machine shown in FIG. 2 also includes a cleaning device which consists of a brush (47) in the example described to ensure the cleaning of the parts of the drum surface which have moved past the transfer station. Following this cleaning, said parts move past an electromagnetic erasing device (48), which erases the latent magnetic images carried by said parts, so that the latter are again capable of being magnetized when they next move past the group of magnetic heads 13-1 through 13-n.

It will be understood of course, that while particular embodiments of the invention have been shown, the invention is not limited thereto since many modifications may be made and it is, therefore, contemplated to cover by the appended claims any such modifications as fall within the true spirit and scope of the invention.

I claim:

1. A magnetographic printing process for obtaining on a carrier an image in p previously chosen colors, p being a whole integer equal to at least 2, comprising the steps of, magnetizing the surface of a recording element in a direction perpendicular thereto so as to produce a group of magnetized points which form a latent magnetic image to produce magnetized points with the same magnetic polarity, but with different intensities of magnetization having the values $J_1$, $J_2$, $J_3, \ldots J_p$ such that $J_1 > J_2 > J_3 \ldots > J_p$, each of said values being associated with each of said p colors, the magnetized points being intended to produce images or parts thereof which must appear on the carrier in the same color and all having the same intensity of magnetization;

then depositing on said surface a first powdery developer to be applied only to the magnetized points of said surface and thus form a powder image, and whose shade is that of the first of said colors, said first developer remaining on all the magnetized prints, eliminating said first developer from the magnetized points, whose magnetization intensities are less than $J_1$;

repeating said depositing operation on said surface with, in proper sequence, each of (p−1) other powdery developers of different shades, said p powdery developers having substantially the same physical properties, each of said depositing operations being immediately followed by a developer removal operation, except for the last depositing operation, the magnetized points involved in said removal operation being, in the course of each said (p−2) removal operations, the points whose intensity of magnetization is less than $J_2$, $J_3$ . . . $J_{p-1}$, respectively, so that, after the last depositing operation, each magnetized point having an intensity of magnetization equal to $J_1$ is coated with p superimposed layers of said developers, each magnetized point having an intensity of magnetization equal to $J_2$ is coated with (p−1) superimposed layers of said (p−1) other developers, and so forth . . . each magnetized point whose intensity of magnetization is equal to $J_p$ then being coated only with a single layer of the $p^{th}$ developer, and finally, performing a total transfer of all said developer layers to the print carrier so as to produce a powder image thereon which consists of a plurality of pinpoint spots, each of which results from the transfer of the developer layers which have been deposited onto each one of said magnetized points and having the color of the developer which, just before the transfer operation, was in direct contact at said point with the surface of the recording element.

2. The process as set forth in claim 1 further including the step of fixing the developer layers transferred to the print carrier.

3. The process as set forth in claim 1 wherein said step of fixing includes subjecting the transferred layers to heat sufficient to soften the layers to ensure fixation onto the carrier but insufficient to cause fusion of the layers.

4. The process of claim 1 wherein each of the powdery developer as deposited are of a substantial equal thickness.

5. The process of claim 1 wherein the superimposed layers of said developers mask the color of the coated layers.

6. A magnetographic printer for obtaining on a carrier an image in p previously chosen colors, p being a whole integer equal to at least 2, comprising a recording element (10) having a magnetic recording surface, a plurality of magnetic heads (13-1 through 13-n) controlled by electric pulses and adapted to magnetize said recording surface in response to said pulses in a direction perpendicular to said surface so as to form a group of magnetized points (A) thereon which produce a latent magnetic image, driving means (25) for causing a relative displacement between the recording element (10) and the magnetic heads (13-a through 13-n), a pulse generator (26) adapted to emit electric pulses selectively to said heads, and an applicator means (40) to allow a powdery developer to be deposited onto said recording surface, said developer remaining applied only to the magnetized points of said surface to form a powder image, said developer including particles whose shade is of the first of the p previously selected colors, electric current-calibrating means (27) connected between the pulse generator (26) and each of the heads (13-1 through 13-n) so as to allow each of the current pulses emitted by said generator to be adjusted selectively to one of the p predetermined amplitude values and thus to form on the recording surface a latent magnetic image whose magnetized points (such as $A_1$, $A_2$, $A_3$) exhibit the same magnetic polarity but have different intensities of magnetization valued as $J_1$, $J_2$, $J_3$ . . . $J_p$, each of said values $J_1>J_2>J_3 . . . >J_p$, being associated with a corresponding one of said p values, such that the magnetized points, intended to produce image parts which, on the print carrier (21), appear in the same color, all having the same intensity of magnetization;

(p−1) other applicator means (42, 44) distributed along the path followed by the recording surface in the course of its displacement, each of said other applicator means capable of depositing onto each magnetized point of said surface a layer of each one of the (p−1) other powdery developers, each of said (p−1) developers having as a shade one each of said colors other than the first color;

(p−1) retouching means (41, 43) each fitted downstream, in relation to the direction of surface displacement, to each of said applicator means (40, 42), except the last one (44), the first of said retouching means (41) being arranged so as to remove the first developer (18) from the magnetized points (such as $A_2$, $A_3$) whose intensity of magnetization is less than $J_1$, the second retouching means (43) being arranged so as to remove the second developer (19) from the magnetized points (such as $A_3$) whose intensity of magnetization is less than $J_2$, and a transfer station (45) fitted downstream to the last applicator means (49) to transfer to the print carrier (21) all the various developer (18, 19, 20) layers which cover the magnetized points of the surface when said points move past said last applicator means.

7. The magnetographic printing machine set forth in claim 6, wherein each magnetic head includes a winding (E) wound around a core (14), and said current-calibrating means (27) comprising:

n circuit portions (C-1, C-2, . . . , C-n) associated with a corresponding one of the n magnetic heads (13-1, 13-2, . . . , 13-n) and each comprising:

a relay contact (such as CB-1) mounted in series with the winding (such as E-1) of the associated head and actuated by a coil (such as B-1) excited selectively by the pulses emitted by the pulse generator (26);

a first switch (such as K-1) comprising p input terminals (1, 2, 3, . . . ) and a moving blade contact connected to one of the ends of the assembly formed by relay contact (CB-1);

and a second switch (such as L-1) comprising p input terminals (1, 2, 3, . . . ) and a moving contact blade connected to the other end of the assembly formed by said winding (E-1) in series with said relay contact (CB-1), said second switch being coupled to the first switch so that the moving contact blades of said two switches assume identical positions on the input terminals of corresponding members;

and p current generators (G1, G2, G3, . . . ), the first (G1) of said current generators having its positive terminal (+) connected to the first (1) of the input terminals of each of the n first switches (K-1 through K-n), and its negative terminal (−) connected to the first (1) of the input terminals of each of the n second switches (L1 through L-n), the second (G2) of said current generators (L-1 through L-n), the second (G2) of said current generators having its positive terminal (+) connected to the second (2) of the input terminals of each of the n first switches (K-1 through K-n) and its negative terminal (−) connected to the second (2) of the input terminals of each of the n second switches (L-1 through L-n), each of said p generators being operatively connected such that, when the relay contacts (CB-1 through CB-n) are closed selectively in response to the pulses emitted by the generator (26), they deliver a corresponding one of the p currents having intensity I1, I2, . . . , $I_p$, said intensities being adjusted such as to cause the formation, in the recording element, of magnetized zones of magnetization $J_1$, $J_2$, $J_3$, . . . , $J_p$, respectively.

8. The printing machine as set forth in claim 6 or 7, further comprising a fixing means (46) situated along the path followed by the print carrier and downstream to the transfer station (45), said fixing means being adjusted such that the developer particles which, deposited onto said carrier, move past said fixing means, are subjected to a softening, but not to a fusion.

9. The printing machine as set forth in claim 6 wherein said fixing means is a heater.

* * * * *